United States Patent [19]

Butenop et al.

[11] Patent Number: 4,518,131
[45] Date of Patent: May 21, 1985

[54] INERTIAL ELEMENT FOR WINDING THE SAFETY BELT OF A MOTOR VEHICLE

[75] Inventors: Klaus Butenop, Herzhorn; Klaus-Peter Singer, Hamburg, both of Fed. Rep. of Germany

[73] Assignee: Autoflug GmbH, Rellingen, Fed. Rep. of Germany

[21] Appl. No.: 441,556

[22] PCT Filed: Mar. 11, 1982

[86] PCT No.: PCT/DE82/00051
§ 371 Date: Nov. 15, 1982
§ 102(e) Date: Nov. 15, 1982

[87] PCT Pub. No.: WO82/03207
PCT Pub. Date: Sep. 30, 1982

[30] Foreign Application Priority Data

Mar. 13, 1981 [DE] Fed. Rep. of Germany ....... 3109554

[51] Int. Cl.³ .................. A62B 35/02; B65H 75/48
[52] U.S. Cl. ............................................. 242/107.4 B
[58] Field of Search ............... 242/107.4 B, 107.4 A, 242/107.3; 280/806; 297/478, 480

[56] References Cited

U.S. PATENT DOCUMENTS 4,027,829 6/1977 Stephenson .............. 242/107.4 B X
4,083,512 4/1978 Rumpf ...................... 242/107.4 B X

FOREIGN PATENT DOCUMENTS 2511503 9/1976 Fed. Rep. of Germany ... 242/107.4 B
2924575 2/1981 Fed. Rep. of Germany ... 242/107.4 B

*Primary Examiner*—John M. Jillions
*Attorney, Agent, or Firm*—Becker & Becker, Inc.

[57] ABSTRACT

An inertial mass having the shape of a metallic ring is held by projections provided on an inertial element. The element is composed of two associated parts, one of which produces the desired inertia. The parts are connected by a snap fit. In one embodiment, the ring includes a curved metallic wire having a gap into which a flange or projection of the inertial element projects.

18 Claims, 6 Drawing Figures

INERTIAL ELEMENT FOR WINDING THE SAFETY BELT OF A MOTOR VEHICLE

FIELD OF THE INVENTION

The present invention relates to an inertial element as a control mechanism for the locking members of belt reeling mechanisms, particularly for safety belts in motor vehicles, with at least belt-sensitive blocking of the belt winding spindle, which can be connected to the belt winding spindle and is preferably in the form of a dish-shaped wheel, with a component serving to increase the mass moment of inertia, and with a return spring.

In self-locking belt reeling mechanisms, as the unrolling movement of the safety belt accelerates, the belt winding spindle is blocked and the belt cannot be unwound further. This is effected by the fact that a locking member mounted on the belt winding spindle and rotating therewith is deflected by a control mechanism, via a suitable connection, until the locking member engages in teeth integral with the housing, thereby blocking the movement of rotation of the belt winding spindle. For this purpose, the control mechanism has a greater mass moment of inertia than the locking member, with the result that, as the unrolling movement of the safety belt accelerates accordingly, the sluggish control mechanism (inertial element) lags behind the movement of rotation of the belt winding spindle with the locking member, and deflects the locking member (belt-sensitive system).

In addition, the control member may also be provided with stops for a lever which can be actuated by a sensor responding to acceleration of the vehicle (vehicle-sensitive system). When the sensor responds, the movement of rotation of the control mechanism, which is constructed as an inertial element, is stopped, with the result that it again lags behind the movement of rotation of the belt winding spindle having the locking member, and deflects the locking member.

PRIOR ART

The known inertial elements are constructed and produced predominantly as masses of pure plastics or metal.

A known inertial element (German Auslegeschrift 25 11 503) consists of a steel ring which is mounted with a running fit directly on the locking member, with a plastics ring being mounted by press fitting on the periphery of the steel ring, the plastics ring cooperating, via cams formed thereon, with control cams of the locking member in order to actuate the latter. The disadvantage of this is that the manufacture of the connection of the steel ring and plastics ring is complex and requires exact dimensioning of the parts. Indeed, the non-slip qualities are subject to stringent requirements, since otherwise the relative movement relative to the locking member, caused by the mass moment of inertia of the steel ring, cannot be effectively converted into actuation of said locking member.

Furthermore, inertial elements are known wherein a metal disc is used in the form of a fixedly mounted component embedded in an injection-molded plastic component which is injection-molded around said metal disc. The disadvantage of inertial elements of this type is their complexity of manufacture. Therefore, the production costs for inertial elements of this type are also comparatively high.

SUMMARY OF THE INVENTION

Starting from the prior art described, the object of the present invention is to provide an inertial element which is simple and cheap to manufacture, and at the same time is reliable in operation.

The inertial element of the present invention is characterized primarily in that the component which serves to increase the mass moment of inertia is formed as a separate ring, especially a metallic ring, which surrounds the axis of the belt winding spindle yet is spaced therefrom, and is supported on projections provided on the inertial element.

According to specific features of the present invention, the ring may be produced as a turned or stamped part, or may be produced by bending wire. The ring may be quadrilateral, preferably rectangular, in cross section, or may be circular in cross section.

The wire ring may have a gap into which a projection formed on the inertial element projects. The ring and projection may be provided on the inside of the peripheral edge of the inertial element, and the projection may be arranged between two of the projections on the inertial element for holding the wire ring in position. The projection may project over the peripheral edge. The width of the gap in the wire ring may be somewhat greater than the width of the projection. The ends of the wire ring adjacent to the gap may be chamfered.

The ring may be housed in an annular compartment formed by the outer peripheral edge of the inertial element and the holding projection. Hooks may be formed on the projections which point towards the annular chamber, project slightly over the ring, and hold it in place in the annular chamber. Alternatively, hooks may be formed on the peripheral edge which point toward the annular chamber, project slightly over the ring, and hold it in place in the annular chamber. The ring can be pressed into the annular chamber, in which connection the projections are resiliently formed. The ring may be mounted on an annular base strip. The annular chamber of the inertial element containing the ring may be raised above the base of the dish by an amount corresponding approximately to the thickness of the material thereof.

The ring may be arranged and clamped in such a way as to extend around the outer periphery of the inertial element.

The inventive concept of a preferably snap-fitting ring as the inertial mass in an inertial element or control mechanism has the advantage that the two components can be manufactured separately and, for assembly, need only be mechanically connected, more particularly pressed one into the other until they snap into position. For this purpose, either the ring may be made rigid and the holding projections resilient, or the ring, especially a wire ring, may be resilient while the projections are rigid. In a preferred embodiment, the wire ring is prevented from rotating and remains constantly in the same position.

BRIEF DESCRIPTION OF THE DRAWINGS

The drawings show an exemplary embodiment of the invention which is described hereinafter. In the drawings.

DESCRIPTION OF PREFERRED EMBODIMENTS

Figure 1:
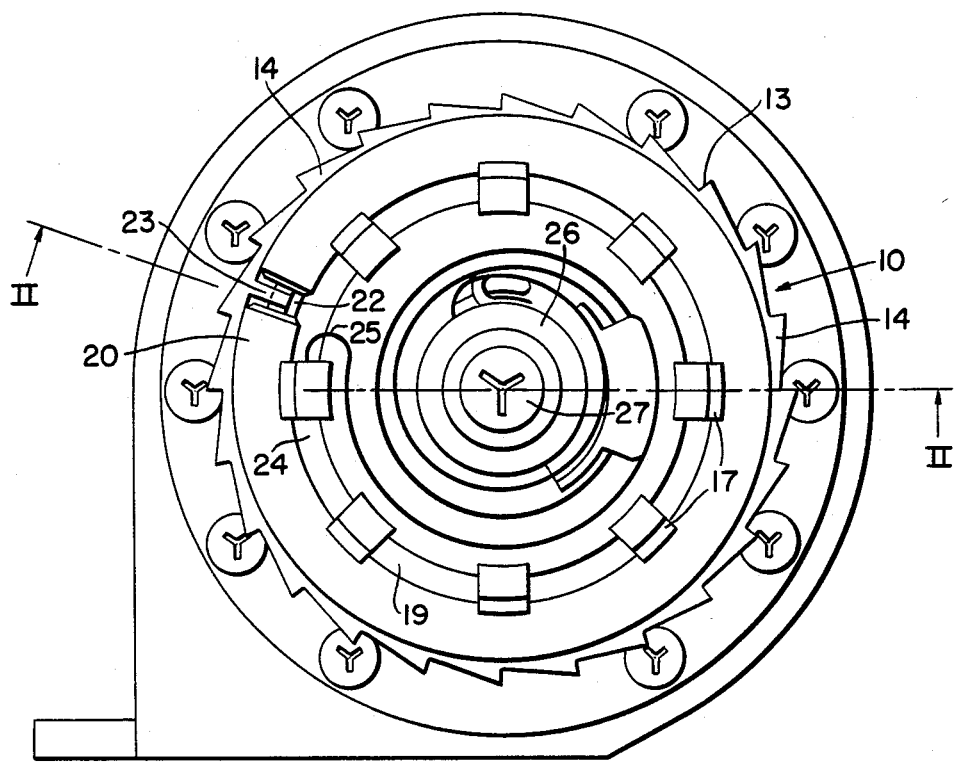
FIG. 1 shows a plan view of the locking end of a belt reeling mechanism which is provided with the inertial element.
Figure 2:
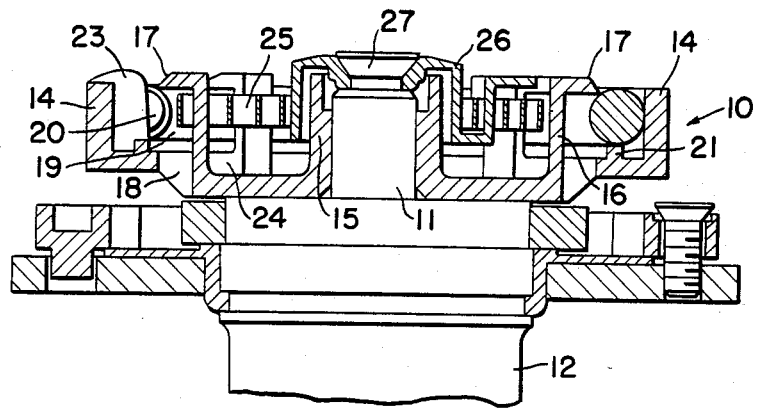
FIG. 2 shows the locking end in section taken on the line II—II in FIG. 1.

A wheel-shaped inertial element 10 made of plastics, also referred to as the inertial disc, is mounted on an extension 11 of the belt winding spindle 12 of a belt reeling mechanism, and is provided on its outer periphery with teeth 13 in the form of saw teeth, which are arranged uniformly spaced over the periphery of the inertial element 10. On its outwardly directed side remote from the belt reeling mechanism, the inertial element 10 is dish-shaped and has an inner space between an outer peripheral edge 14 and a sleeve 15 which projects from the center of the dish and is integrally formed therewith; this sleeve 15 serves to hold and thus mount the inertial element 10 on the spindle extension 11. The inner space is divided into two annular compartments by means of strip-like projections 16 arranged at right angles to the base of the inertial element 10; these projections 16 are arranged in a circle and at uniform spacing from one another. At their upper end, the projections 16 have hooks 17 which point outwardly toward the peripheral edge 14 of the inertial element 10 as shown in FIGS. 1 and 2. At the base of the projections 16 are perforations or openings 18 which correspond in their dimensions to the hooks 17 located above them.

In the annular compartment 19 formed by the outer peripheral edge 14 and the projections 16 there is inserted a curved wire ring 20, the diameter of which is such that the hooks 17 of the projections 16 project slightly over the wire ring 20 in the inserted position, thus holding this wire ring 20 in place in the inertial element 10. Since the projections 16 with hooks 17 are resilient by virtue of the material used and their shape, the wire ring 20 can be pressed into the annular compartment 19 between the peripheral edge 14 and the hooks 17 of the projections 16, and then rests on a circumferential base strip 21 integrally formed on the base of the annular compartment 19.

The wire ring 20 is not completely closed, but has a gap 22. A projection 23 integrally connected to the inside of the outer peripheral edge 14 and to the base of the inertial element 10 projects inwardly into the annular compartment 19, with the wire ring 20 being placed in the annular compartment 19 in such a way that the projection 23 engages in the gap 22 in the wire ring 20 and prevents the latter from moving in the circumferential direction. The projection 23 is arranged in the center of a portion of the annular compartment 19 defined by two projections 16.

The projection 23 projects slightly beyond the peripheral edge 14 of the inertial element 10 so that the wire ring 20 can be placed on the inertial element 10 in the correct position even before being inserted in the annular compartment 19, and cannot slide out of place once pressed in.

In order to facilitate the snap-fitting of the wire ring 20 into the annular compartment 19, the gap 22 is somewhat broader than the projection 23. For the same reason, the two ends of the wire ring 20 adjacent to the gap 22 are chamfered, so that the ends of the wires do not catch on the projection 23 when pressed in.

In an inner annular chamber 24 formed by the sleeve 15 and the projections 16, there is a helical g-value spring 25 as a return spring, one end of which is suspended on one of the projections 16, and the other end of which is suspended on a sleeve-like abutment 26. The abutment 26 is placed over the sleeve 15 of the inertial element 10, and is secured to the extension 11 of the belt winding spindle 12 by means of a screw 27.

The outer region of the base of the dish-shaped inertial element 10, which region supports the wire ring 20, is higher by an amount corresponding approximately to its wall thickness, by means of a sloping step.

Figure 1B:
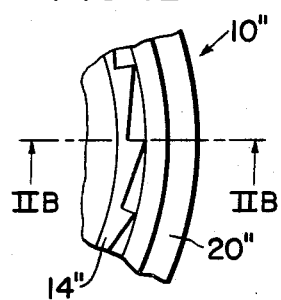
FIG. 1B is a fragmentary plan view showing a further modification of FIG. 1.
Figure 1A:
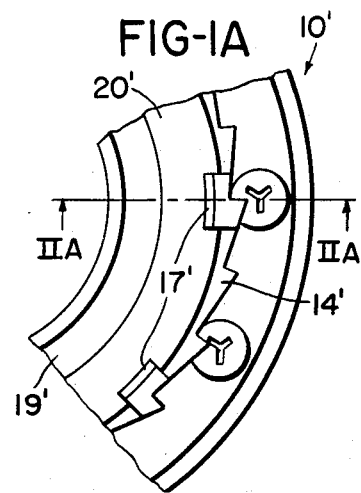
FIG. 1A is fragmentary plan view showing a modification of FIG. 1.
Figure 2B:
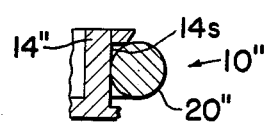
FIG. 2B is a fragmentary sectional view taken along line IIB—IIB in FIG. 1B.
Figure 2A:
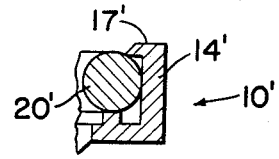
FIG. 2A is a fragmentary sectional view taken along line IIA—IIA in FIG. 1A.

FIGS. 1A and 2A show a modification wherein an inertial element 10' includes hooks 17' formed on peripherial edge 14' of an inertial disc and directed radially inwardly toward an annular compartment 19' such that the hooks 17' project slightly over the wire ring 20' to hold it in place in the annular compartment 19'. Reference numerals in these views have a prime added thereto for comparable parts.

FIGS. 1B and 2B show another modification wherein an inertial disc includes an outer peripherial edge 14" with a wire ring 20" being disposed on a radially outer surface 14s of the peripheral edge 14" of the inertial disc of the inertial element 10".

The features of the object of the application appearing in the preceding specification, claims and drawings may be essential to the realization of the invention in its various embodiments, both individually and in any desired combinations with one another.

What we claim is:

1. An inertial element as the control mechanism for locking members of belt reeling mechanisms having at least belt-sensitive blocking of the belt winding spindle thereof; said inertial element comprising:

an inertial disc mounted on said belt winding spindle, said inertial disc being provided with at least two first projections;

a ring which, as a separate component, serves to increase the mass moment of inertia; said ring surrounding, yet being spaced from, the axis of said belt winding spindle; said ring being held by said first projections;

said inertial disc being provided with a second projection;

said ring being provided with a gap into which said second projection extends; and a return spring connected between said inertial disc and said belt winding spindle for biasing said inertial disc in a predetermined direction relative to said winding spindle.

2. An inertial element according to claim 1, in which said inertial disc is a dish-shaped wheel, and in which said ring is a metallic ring.

3. An inertial element according to claim 2, in which said ring is a turned part.

4. An inertial element according to claim 2, in which said ring is a stamped part.

5. An inertial element according to claim 2, in which said ring is a bent wire.

6. An inertial element according to claim 1, in which said ring has a quadrilateral cross section.

7. An inertial element according to claim 1, in which said ring has a circular cross section.

8. An inertial element according to claim 1, in which said inertial disc includes an outer peripheral edge; in which said ring is disposed on the radially inner surface of said peripheral edge; and in which said second projection is arranged on the radially inner surface of said peripheral edge between two first projections for holding said ring in position.

9. An inertial element according to claim 8, in which said second projection projects beyond said peripheral edge.

10. An inertial element according to claim 1, in which the width of said gap in said ring is somewhat greater than the width of said second projection.

11. An inertial element according to claim 1, in which the ends of said ring adjacent said gap thereof are chamfered.

12. An inertial element according to claim 1, in which said inertial disc includes an outer peripheral edge; and which includes an annular compartment formed by said peripheral edge and said first projections, said ring being accommodated in said annular compartment.

13. An inertial element according to claim 12, which includes hooks formed on said first projections and directed radially outwardly toward said annular compartment, said hooks projecting slightly over said ring to hold it in place in said annular compartment.

14. An inertial element according to claim 12, which includes hooks formed on said peripheral edge of said inertial disc and directed radially inwardly toward said annular compartment, said hooks projecting slightly over said ring to hold it in place in said annular compartment.

15. An inertial element according to claim 13, in which said first projections are resilient, and in which said ring is adapted to be pressed into said annular compartment.

16. An inertial element according to claim 12, in which said inertial disc is further provided with an annular base strip, said ring being supported thereon.

17. An inertial element according to claim 12, in which said inertial disc is a dish-shaped wheel having a stepped base, with the base of said annular compartment coinciding with that portion of said stepped base which is less deep than the remainder of said stepped base by an amount approximately equal to the thickness of the material thereof.

18. An inertial element according to claim 1, in which said inertial disc includes an outer peripheral edge, and in which said ring is disposed on the radially outer surface of said peripheral edge.

* * * * *